United States Patent [19]

Harney

[11] Patent Number: 4,924,584
[45] Date of Patent: May 15, 1990

[54] METHOD OF FASTENING A TUBULAR ELEMENT TO A MEMBER AND JOINT PRODUCED THEREBY

[75] Inventor: William J. J. Harney, Willowdale, Canada

[73] Assignee: Magna International Inc., Markham, Canada

[21] Appl. No.: 217,949

[22] Filed: Jul. 12, 1988

[30] Foreign Application Priority Data

Jul. 13, 1987 [CA] Canada ................................. 541927

[51] Int. Cl.⁵ ............................................. B21D 39/00
[52] U.S. Cl. ..................................... 29/509; 29/522.1; 29/523; 403/230; 403/240; 403/242; 403/277
[58] Field of Search ....................... 29/505, 509, 522.1, 29/523; 403/187, 230, 233, 240, 242, 244, 248, 277, 280

[56] References Cited

U.S. PATENT DOCUMENTS 4,781,076 11/1988 Hartnett et al. ...................... 29/523

Primary Examiner—Timothy V. Eley
Attorney, Agent, or Firm—Ivor M. Hughes

[57] ABSTRACT

A method of fastening, at least one tubular element at, at least one portion thereof to an at least one member of predetermined thickness, the method comprising establishing at least one opening through the at least one member, the at least one opening extending through the thickness of the at least one member, providing recesses within the at least one member, the recesses of predetermined configuration and being disposed about the perimeter of the at least one opening through the at least one member, the recesses extending radially away from the at least one opening and across at least a portion of the thickness of the at least one member, inserting the at least one tubular element within the at least one opening; holding the at least one tubular element and the at least one member within a jig; establishing recesses within the jig proximate each abutting edge of each of the tubular elements and the at least one opening through the at least one member; applying a predetermined force upon the ends of the at least one tubular element, the force being of a substantial predetermined magnitude to cause the wall portion of the at least one tubular element proximate the at least one opening and proximate the recesses established within the jig, to bead radially away from the at least one tubular element and further cause radial portions of each bead proximate the at least one opening to flow into the recesses formed within the at least one opening about the perimeter of the at least one opening; such beading providing fastening engagement between the at least one tubular eleent and the at least one member wherein no further fastening is required.

10 Claims, 9 Drawing Sheets

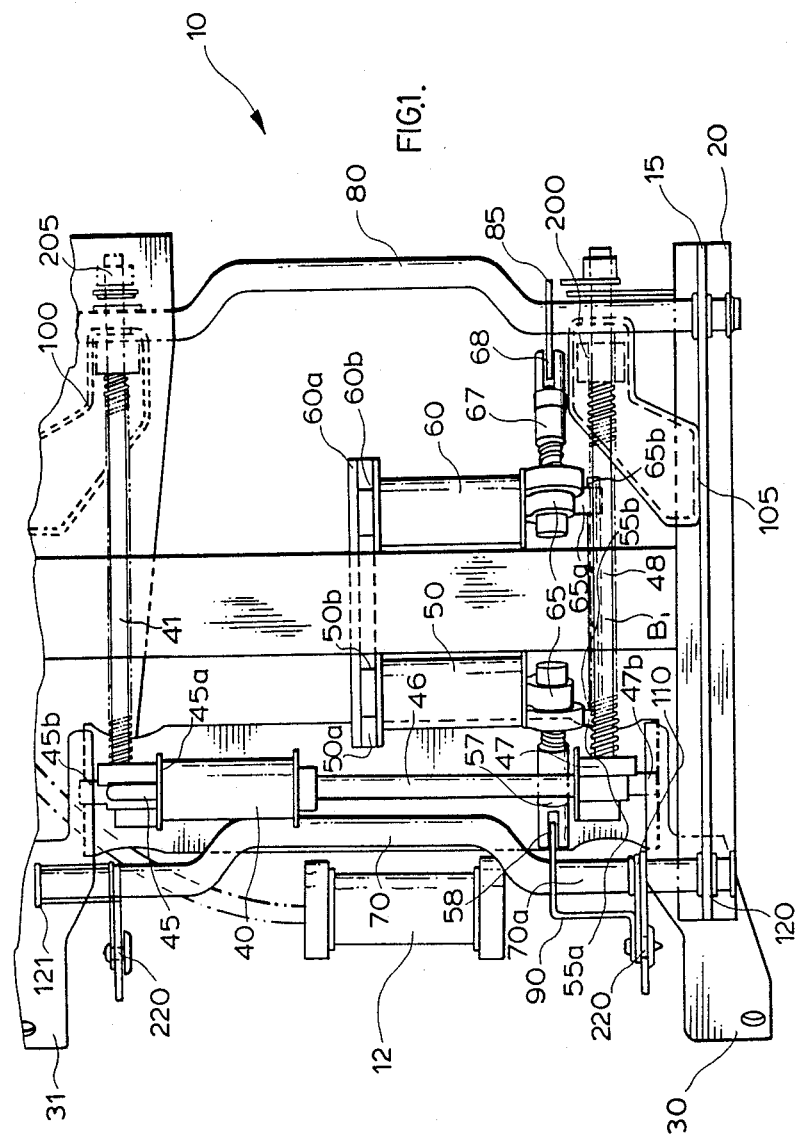

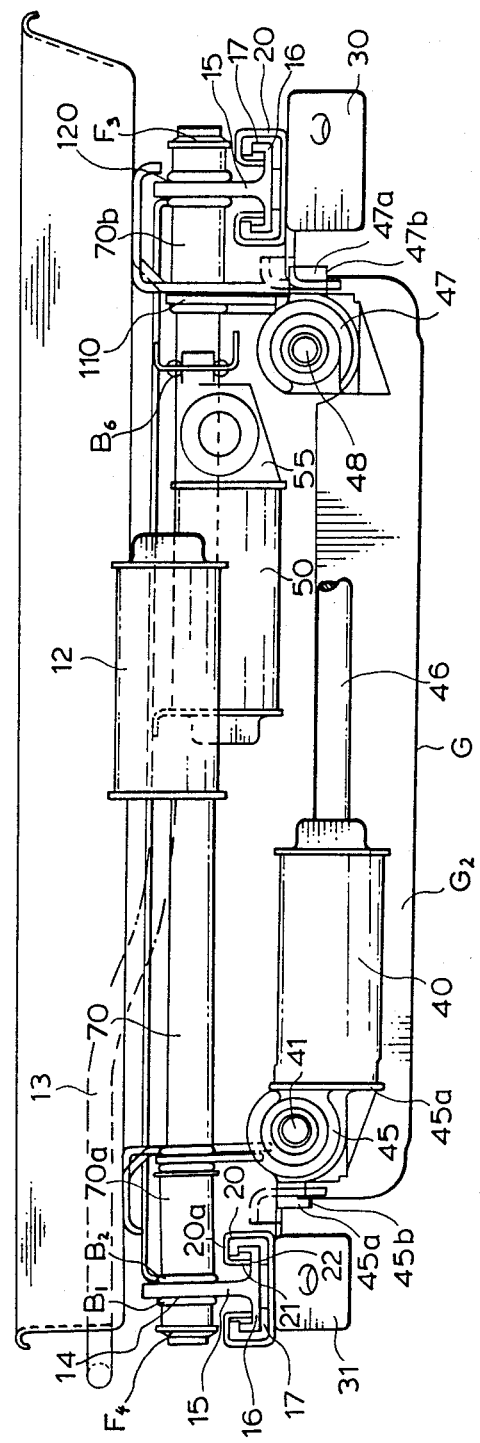

METHOD OF FASTENING A TUBULAR ELEMENT TO A MEMBER AND JOINT PRODUCED THEREBY

FIELD OF INVENTION

This invention relates to powered seat adjusters, mechanisms and improvements therefor, and more specifically to those found in vehicles. Further the instant invention incorporates novel fastening methods and apparatuses thereof having broader application.

BACKGROUND OF INVENTION

Powered seat adjusters are known in the art. However, there exists within the prior art a host of problems which remain unresolved as yet. For example, it is well known to provide a cluster drive of motors, for example comprising three motors sharing a common housing used to drive the vertical and horizontal adjusting mechanisms. Such a cluster unit drives flex cables which in turn provides the motivation for any adjustment. There are some advantages in using a cabled system, for example the resiliency and ability to flex under loads. However, there are many disadvantages in providing a system with a cable drive in that they do become a high maintenance item and have proved unreliable over the life of the unit. Further, cable drive units have proven themselves to be excessively noisy in operation. It has been discovered that the cluster drive is expensive to replace and has a large mass to support within the seat structure. Further, the central drive of the cluster drive has proven to be weaker than the two outside drives. The instant invention overcomes the unreliability of the aforementioned mechanism, retaining the desirable resiliency and load absorbing abilities therein, while providing smooth reliable working of the mechanism. Further, maintenance of the unit is further simplified.

In powered seat adjusters within the prior art, there exists supplementary mechanisms which provide separate subassemblies to resolve impact forces through to the structural elements of a vehicle. Such subassemblies are expensive, heavy, and complicate the manufacturing process of the unit. Also, in some cable systems such impact forces are not adequately resolved. The instant invention overcomes these problems and provides a seat track which incorporates the aforementioned resolution requirements as an integral part thereof.

Further within, for example, seat track assemblies in the prior art, the fastening of the components of such an assembly are typically welded or riveted. The instant invention provides a novel fastening method and apparatuses therefor that go beyond known fastening techniques and improves the strength, reliability and cost of manufacture therefor.

Further within seat track assemblies, a host of track cross sections exist. The instant invention provides a track assembly which goes beyond the prior art providing a structural track of much improved performance and strength.

Within mechanisms within the prior art offering anti-chuck features, it is known to provide slotted assemblies to allow for the movement of rivets or pins therein, for example for resolving horizontal vectors of rotation forces, the slotted assemblies being reinforced or lined but being constructed in a manner which allows for deterioration in the anti-chuck features in time. The instant invention provides anti-chuck features which go beyond the prior art and establish a minimum of tolerances in manufacture which can deteriorate and result in the assembly having unacceptable levels of play therein.

It is known in the prior art to use a lead screw in conjunction with a gear box connected to a drive motor. However, the instant invention integrates the drive motor with the gear box as a module in for example a seat assembly, and standardizes the modules used for ease of repair. Further, the module is resiliently mounted and provides motivation to sensors or slave units which further enhance the seat assembly.

It is therefore an object of the present invention to overcome many of the problems present in the prior art for seat assemblies to provide methods of manufacture of a powered seat adjuster which is assembled using no welding yet is strong, lightweight and reliable.

It is a further object of the invention to provide a novel drive motor module which is standardized in format and incorporates the necessary reduction devices to power a seat adjuster.

It is still a further object of the invention to provide novel fastening means for tubing.

It is a further object of the invention to provide a structural powered seat adjuster which is reliable and sturdy.

It is still a further object of the invention to provide drive motors with a power take off ability to motivate slave, or remote devices.

It is a further object of the invention to provide improved anti-chuck features therein and a method of construction therefor.

It is a further object of this invention to provide a cost efficient assembly which is durable and easy to maintain.

Further and other objects of the invention will become apparent to a man skilled in the art when considering the following summary of the invention and the more detailed description of the preferred embodiments illustrated herein.

SUMMARY OF THE INVENTION

According to one aspect of the invention, an integrated drive module incorporating reduction means is provided for driving an integral threaded lead screw, the drive module comprising; driving means (preferably an electric motor) contained within a first housing for generating rotational forces within the integrated drive module; reduction means for transmission of the rotational forces of the driving means, the reduction means contained within a second housing in communication with the first housing, preferably the reduction means comprising a set of reduction gears; the driving means having rotating driven means passing through the driving means and in communication with the reduction means, the rotating driven means being motivated to rotate by the rotational forces generated by the driving means, preferably the rotating driven means comprising a worm shaft extending from the driving means in communication with compatible worm gears within the second housing disposed at one end of the driving means, preferably the driven means also extending from the driving means remote the reduction means which provides a take off point for a slave reduction means and/or a digital or analog sensor; whereby the integrated drive module provides a modular drive assembly incorporating reduction means therefor.

According to another aspect of the invention for use in a vehicle seat adjuster, an integrated drive module incorporating reduction means is provided for driving an integral lead screw, the drive module comprising, driving means (preferably an electric motor) contained within a first housing for generating rotational forces within the integrated drive module; reduction means for transmission of the rotational forces of the driving means, the reduction means contained within a second housing in communication with the first housing, preferably the reduction means comprising a set of reduction gears; the driving means having rotating driven means passing through the driving means and in communication with the reduction means, the rotating driven means being motivated to rotate by the rotational forces generated by the driving means, preferably the rotating driven means comprising a worm shaft extending from the driving means in communication with compatible worm gears within the second housing disposed at one end of the driving means, preferably the driven means also extending from the driving means remote the reduction means which provides a take off point for a slave reduction means and/or a digital or analog sensor; whereby the integrated drive module provides a modular drive assembly incorporating reduction means therefor.

According to another aspect of the invention the integrated drive module may comprise an integral lead screw extending outwardly away from the module proximate the reduction means.

According to another aspect of the invention, the integrated drive module may be used in conjunction with a threaded preferably tubular nut in communication with a lead screw extending outwardly away from the module proximate the reduction means, preferably the preferably tubular nut being fastened to a bell crank used to vertically adjust the front or rear of a vehicle seat.

According to yet another aspect of the invention, the integrated drive module may comprise resilient mounting means proximate the reduction means, the resilient mounting for abutting the nut of the reduction means preferably for operation in conjunction with a preferably tubular nut.

According to yet another aspect of the invention, the integrated drive module may be used in conjunction with a preferably tubular nut in communication with a lead screw extending outwardly away from the module proximate the reduction means, the preferably tubular nut being fastened to a bell crank preferably used to vertically adjust the front or rear of a vehicle seat, the nut having resilient means fastened thereto for abutting the bell crank when pivoted to a predetermined position or alternatively the bell crank having resilient means fastened thereto for abutting the nut when the bell crank is pivoted to a predetermined position.

According to yet another aspect of the invention, the integrated drive module may be installed within a powered seat adjuster assembly comprising front vertical adjustment, rear vertical adjustment and horizontal adjustment, preferably the modules being of standard specifications so as to enable them to be interchangeable with one another with no change in power demand, or output for each module.

According to another aspect of the invention, the integrated drive module may comprise a worm which is an integral part of the electric motor armature.

According to another aspect of the invention, the integrated drive module may comprise sensor means connected to the driven means remote the reduction means, preferably the sensor means for establishing comfort seatings with a powered seat adjuster.

According to another aspect of the invention, the integrated drive module may comprise driven means which extends from the driving means remote the reduction means, the driven means extending to a second reduction means remote the first reduction means.

According to another aspect of the invention, the integrated drive module may comprise resilient mountings between the integrated drive module and a mounting bracket therefor.

According to yet another aspect of the invention, the integrated drive module may comprise a lug extending outwardly away from the second housing of the reduction means, the lug for mounting the module at one end thereof within an opening; preferably the opening being lined by a grommet extending therethrough, the grommet being formed with resilient flanges and/or hook portions therefor which anchor the grommet through the opening.

According to another aspect of the invention, the integrated module may comprise at least one member fastened to the casing of the reduction means, the driving means, and when used the second reduction means to provide stiffening of the integrated module when subjected to twisting or bending loads, preferably the at least one member being incorporated with a guard member used to encase the integrated module.

According to one aspect of the invention, for use in conjunction with a lead screw, a load bearing structural assembly is provided, the assembly comprising a threaded lead screw having a central axis, the lead screw having mounting means and anchor means (preferably a nut) affixed to one end thereof; the lead screw having mounted thereon a first drive nut having an opening therethrough, the first drive nut having a predetermined load bearing capacity, the circumference of the opening of the first drive nut having compatible threading with the lead screw; the structural assembly having a second drive nut having an opening therethrough, the second nut affixed to the first drive nut preferably the second nut being segmented and preferably having a conical exterior surface tapering away from the first drive nut, the second nut having a much greater predetermined load bearing capacity than the first drive nut and having threading disposed about the circumference of the opening compatible with the lead screw; the structural assembly having a collet having an interior and exterior, the collet in communication with the exterior surface of the second drive nut upon the interior of the collet, having an opening therethrough preferably sloped, the opening compatibly sloped with the exterior surface of the second drive nut; having transmission means affixed to the first drive nut and the collet, whereby the first drive nut is driven by the rotation of the lead screw when the first drive nut is subjected to loads less than or equal to its predetermined load bearing capacity and the second drive nut does not interfere with the movement of the first drive nut when the first drive nut is subjected to loads less than or equal to its predetermined load bearing capacity thereby driving the transmission means in a predetermined direction; whereby when the transmission means subjects a load upon the first drive nut in a direction along or parallel to the central axis of the lead screw, such load being greater than the predetermined load bearing capacity of the first drive nut, causing the first nut to fail, such load will also be subjected upon the collet which will further capture the second drive nut within the opening at the interior of the collet and force the second drive nut to clamp down on the lead screw sufficiently to prevent rotation of the lead screw and to pass the load from the transmission means to the collet, from the collet to the second drive nut, from the second drive nut to the lead screw, from the lead screw to the anchor means, and from the anchor means to the mounting means, thereby resolving the axial loading of the lead screw.

According to another aspect of the invention for use in a vehicle seat adjuster, for use in conjunction with a lead screw, a load bearing structural assembly is provided, the assembly comprising a threaded lead screw having a central axis, the lead screw having mounting means and anchor means (preferably a nut) affixed to one end thereof; the lead screw having mounted thereon a first drive nut having an opening therethrough, the first drive nut having a predetermined load bearing capacity, the circumference of the opening of the first drive nut having compatible threading with the lead screw; the structural assembly having a second drive nut having an opening therethrough affixed to the first drive nut preferably the second nut being segmented and preferably having a conical exterior surface tapering away from the first drive nut, the second nut having a much greater predetermined load bearing capacity than the first drive nut and having threading disposed about the circumference of the opening compatible with the lead screw; the structural assembly having a collet having an interior and exterior, the collet in communication with the exterior surface of the second drive nut upon the interior of the collet, having an opening therethrough preferably sloped, the opening compatibly sloped with the exterior surface of the second drive nut; having transmission means affixed to the first drive nut and the collet, whereby the first drive nut is driven by the rotation of the lead screw when the first drive nut is subjected to loads less than or equal to its predetermined load bearing capacity and the second drive nut does not interfere with the movement of the first drive nut when the first drive nut is subjected to loads less than or equal to its predetermined load bearing capacity thereby driving the transmission means in a predetermined direction; whereby when the transmission means subjects a load upon the first drive nut in a direction along or parallel to the central axis of the lead screw, such load being greater than the predetermined load bearing capacity of the first drive nut, causing the first nut to fail, such load will also be subjected upon the collet which will further capture the second drive nut within the opening at the interior of the collet and force the second drive nut to clamp down on the lead screw sufficiently to prevent rotation of the lead screw and to pass the load from the transmission means to the collet, from the collet to the second drive nut, from the second drive nut to the lead screw, and from the lead screw to the anchor means, and from the anchor means to the mounting means, thereby resolving the axial loading of the lead screw, preferably the transmission means being a bracket affixed to a seat track, preferably the mounting means being a mounting bracket for a seat assembly, the mounting bracket being affixed to the structure of the vehicle, preferably the first drive nut and collet for movement of the moveable track of a seat track assembly, being affixed to a bracket affixed to the seat track for movement thereof.

According to yet another aspect of the invention, for use in conjunction with a lead screw, a load bearing structural assembly is provided, comprising a member (preferably a nut or a block) having an opening therethrough, the opening being threaded about its circumference, the threading having a predetermined number of splines dissecting the continuity of the threading, the splines extending in a direction parallel to the exterior of the lead screw, the member having a transmission means connected thereto whereby when the member is subjected to a load parallel to the direction of extension of the lead screw, the load being greater than a load required to deform the thread of the member into the splines thereof sufficiently to prevent rotation of the lead screw, thereby preventing the rotation of the lead screw.

According to yet another aspect of the invention, the structural assembly may comprise anchor means comprising a member having a surface disposed proximate the mounting means, the surface having disposed thereon engagement means, whereby when the lead screw moves in a direction away from the member thereby engaging the engagement means with the mounting means, such engagement will prevent the rotation of the lead screw (preferably the member being a nut or a block).

According to yet another aspect of the invention, the structural assembly may comprise transmission means further comprising a bracket means comprising a housing to carry the structural assembly. According to yet another aspect of the invention, the structural assembly may comprise transmission means comprising bracket means integrally formed with a collet or member therefor.

According to another aspect of the invention preferably for use in a vehicle seat, an improved pivot assembly is provided, the improved pivot assembly comprising a pivot means upon which a seat adjuster pivots, a bracket means having an elongated slot in which a fastening means for the pivot means is contained, a lining portion affixed to the bracket means (preferably staked, riveted or welded), the lining portion having flanges extending through the elongated slot laterally away from the lining portion, the flanges having a predetermined curvature, a fastening means (preferably a rivet) passing through the lining portion, bracket means and pivot means, whereby when the fastening means is affixed to the pivot means through the bracket means the flanges of the lining portion are biased against the fastening means, thereby the tolerances of the improved pivot assembly are optimized to allow a minimum of play or chuck amongst the components therefor.

According to yet another aspect of the invention, a track assembly is provided, preferably for use as a seat track assembly in a vehicle, the track assembly comprising a first rail and a second rail, the first rail comprising preferably a generally U-shaped cross section, having two legs extending away from the closed portion of the first rail or when used the U, each leg having arcuate flanges disposed at the ends thereof remote the closed portion of the first rail or when used the U, the arcuate flanges bending radially inward at a predetermined radius of curvature from the extremity of each leg away therefrom towards the closed portion of the U; the second rail (preferably being extruded from heat treated aluminum), having a J and a mirror imaged J profile joined thereat comprising a double "J" cross section, the second rail having a centrally disposed portion extending in the same direction as the legs of the first rail, the centrally disposed portion having extended therefrom at one end of the cross section thereof two flanges extending away from the centrally disposed portion, the flanges then bending upwardly at the ends thereof in a direction substantially parallel to the extension of the legs of the first rail cross section, (preferably the ends thereof bending downwards as well when an insert is placed between the first and second rails) whereby in use at least one of the first and second rails are moveable with respect to one another when the second rail is inserted within the first rail wherein the arcuate flanges of the first rail terminate proximate the two flanges extending away from the centrally disposed portion of the second rail, preferably the first rail and the second rail having disposed therebetween insert means to provide a bearing surface upon which the rails move.

According to yet another aspect of the invention the track assembly may comprise a first and second rail wherein the first rail is a stationary rail and the second rail is a moveable rail, moveable within the first rail.

According to yet another aspect of the invention the track assembly may comprise a first and second rail wherein the first rail is a moveable rail and the second rail is a stationary rail, the first rail being moveable about the second rail.

According to yet another aspect of the invention the track assembly may comprise insert means which clip to the two flanges extending away from the centrally disposed portion of the second rail (preferably the insert means being plastic).

According to yet another aspect of the invention the track assembly may comprise insert means comprising four separate plastic sections preferably having a "C" shaped and mirror image "C" shaped cross section.

According to yet another aspect of the invention the track assembly may comprise insert means which are injection molded upon the exterior of the flanges extending away from the centrally disposed portion of the second rail. (Preferably the extension of the flanges being etched or scored prior to injection molding of the insert means thereupon to allow intimate fastening therefor).

According to yet another aspect of the invention, a method of assembling a torque tube within a seat track is provided, the seat track comprising a preferably vertically disposed portion through which an opening is disposed, the opening having inserted therethrough a first tubular element, and a second tubular element comprising a torque tube having an outer diameter substantially equal to the inner diameter of the first tube, the method comprising forming an opening in the track portion; inserting the first tubular element within the opening, the tubular element having an outside diameter substantially equal to the inside diameter of the opening; holding the first tubular element and the track in a jig, establishing a recess within the jig proximate each abutting edge of the tubular element proximate the opening through the seat track, applying a predetermined force upon the ends of the tubular element, the force being of substantial predetermined magnitude to cause the wall portions of the tubular element proximate the opening, and proximate the recesses established within the jig, to bead radially away from the tubular element, such beading providing fastening engagement between the track portion and the first tubular element, whereby the second tubular element is inserted within the first tubular element through the track and anchored thereat by anchoring means proximate the exterior of the track.

According to another aspect of the invention, the track assembly may comprise torque tubes which are fastened to the second track adjacent openings through the second track by a method of beading a first tubular element proximate the openings through the second track, the second track comprising a preferably vertically disposed portion through which an opening is disposed, the opening having inserted therethrough a first tubular element, and a second tubular element comprising a torque tube having an outer diameter substantially equal to the inner diameter of the first tube, the method comprising forming an opening in the track portion; inserting the first tubular element within the opening, the tubular element having an outside diameter substantially equal to the inside diameter of the opening; holding the first tubular element and the track in a jig, establishing a recess within the jig proximate each abutting edge of the tubular element proximate the opening through the seat track, applying a predetermined force upon the ends of the tubular element, the force being of substantial predetermined magnitude to cause the wall portions of the tubular element proximate the opening, and proximate the recesses established within the jig, to bead radially away from the tubular element, such beading providing fastening engagement between the track portion and the first tubular element, whereby the second tubular element is inserted within the first tubular element through the track and anchored thereat by anchoring means proximate the exterior of the track.

According to yet another aspect of the invention, a method of fastening, at least one tubular element at, at least one portion thereof to an at least one member of predetermined thickness, is provided, the method comprising establishing at least one opening through the at least one (preferably planar) member, the at least one opening extending through the thickness of the at least one member, providing recesses within the at least one member, the recesses of predetermined configuration and being disposed about the perimeter of the at least one opening through the at least one member, the recesses extending radially away from the at least one opening and across at least a portion of the thickness of the at least one member, preferably the recesses being formed in pairs adjacent the exterior edges of the at least one opening; inserting the at least one tubular element within the at least one opening; holding the at least one tubular element and the at least one member within a jig; establishing recesses within the jig proximate each abutting edge of each of the tubular elements and the at least one opening through the at least one member; applying a predetermined force upon the ends of the at least one tubular element, the force being of substantial predetermined magnitude to cause the wall portions of the at least one tubular element proximate the at least one opening and proximate the recesses established within the jig, to bead radially away from the at least one tubular element and further cause radial portions of each bead proximate the at least one opening to flow into the recesses formed within the at least one opening about the perimeter of the at least one opening; such beading providing fastening engagement between the at least one tubular element and the at least one member wherein no further fastening is required.

According to yet another aspect of the invention, at least one joint for fastening at least one tubular element to at least one member of predetermined thickness is provided, the at least one joint comprising at least one opening through the at least one (preferably planar) member, the at least one opening extending through the thickness of the at least one member, having recesses established within the at least one member, the recesses of predetermined configuration and disposed about the perimeter of the at least one opening through the at least one member, the recesses extending radially away from the at least one opening and across at least a portion of the width of the at least one member preferably the recess being formed in pairs adjacent the exterior edges of the at least one opening, the at least one tubular member for insertion within the at least one opening, the at least one tubular element and the at least one member being joined within a jig, having established recesses within the jig proximate each abutting edge of the at least one tubular element and the at least one opening through the at least one member, whereby when a predetermined force is applied upon the ends of the at least one tubular element, the force being of substantial predetermined magnitude to cause the wall portions of the at least one tubular element proximate the at least one opening and proximate the recesses established within the jig to bead radially away from the at least one tubular element and further cause radial portions of each bead proximate the at least one opening to flow into the recesses formed within the at least one opening about the perimeter of the at least one opening, such beading providing fastening engagement between the at least one tubular element and the at least one member wherein no further fastening is required.

According to yet another aspect of the invention, the method of fastening may comprise elements of a vehicle seat assembly.

According to yet another aspect of the invention, the at least one joint may comprise elements of a vehicle seat assembly, preferably at least one bell crank and at least one torque tube.

According to yet another aspect of the invention, the method of fastening may comprise elements of a vehicle seat assembly preferably at least one bell crank and at least one torque tube.

According to yet another aspect of the invention, a powered seat adjuster may comprise resilient members in communication with mounting brackets the resilient members comprising mounting pads for mounting all drive members upon the brackets therefor, and reduction means therefor, to reduce the amount of wear and tear on the components and reduction of noise by dampening vibration of said drive members and said reduction means, and thereby dampen any unwanted transmission of vibration.

According to one aspect of the invention, a powered seat adjuster is provided, the adjuster comprising a top, bottom, front, rear and two sides, the adjuster having disposed upon its bottom anchor means for anchoring the seat adjuster to the floor of a vehicle; the anchor means having secured thereto a fixed rail of a seat track, preferably the fixed rail being of generally U-shaped cross-section having two legs extending upwardly away from the anchor means, the upwardly extending legs each having a radially extending flange disposed at the end thereof of predetermined radius of curvature, the fixed rail having inserted therein a moveable rail, slideable within the fixed rail, preferably the moveable rail being of a double "J" cross-section having upwardly extending flanges abutting the flanges of the fixed rail upon bearing surfaces disposed between the flanges of the fixed rail and flanges of the moveable rail; the seat adjuster having disposed at each side thereof a moveable and a fixed rail, the moveable and fixed rails being interconnected to form a seat track assembly within the adjuster, preferably the seat tracks being joined together in part by tubular shafts enclosed and extending through tubular collars joined to the moveable rail at beaded joints for affixing the tubular shafts to corresponding openings within the moveable rail, preferably such fastening being accomplished forwardly and rearwardly within the seat adjuster, preferably the tubular shaft extending through a bell crank, at least one each disposed proximate the front and rear of the seat adjuster for vertically displacing the seat; the bell crank being fastened to a preferably tubular nut having an opening at the end remote the bell crank, the opening being threaded for the insertion of a compatible lead screw, the lead screw being driven by a drive motor affixed to the seat adjuster for driving the bell crank pivotally and thereby effecting such vertical adjustment of the seat, the seat adjuster having disposed preferably at the front thereof a drive motor for driving at least two lead screws disposed in a horizontal direction from front to rear of the seat adjuster at the sides thereof proximate the seat track, the lead screws being in communication with the drive motors through gear reduction means which allow the lead screw to rotate at a predetermined speed, each lead screw having disposed thereon a nut assembly, the assembly having an opening therethrough, the opening being threaded compatibly with the lead screw, the nut assembly having connected thereto a bracket having two ends, the bracket being affixed at one end to the nut assembly and at the other end thereof to the moveable rail of the seat track, thus movement of the nut assembly upon the horizontally disposed lead screws will cause the moveable track to slide within the fixed track, each lead screw having disposed at the end thereof mounting means and at least one of the lead screws being disposed at the end of the mounting means anchor means to sustain the rotation of the lead screw and movement of the nut assembly upon the lead screw, preferably the drive motor, having two ends and having disposed at one end thereof an integrally mounted gear reduction means from which the lead screw extends and having extending from the other end of the drive motor a shaft of predetermined length extending away from the drive motor towards the lead screw disposed on the other side of the seat adjuster, the shaft thereat connected to a slave gear reduction means for communication with the lead screw disposed thereat for movement at substantially the same rate as the lead screw disposed proximate the drive motor, preferably the nut assembly comprising a first nut of predetermined load bearing capacity, the first nut being affixed to the bracket affixed to the seat track, a second nut affixed to the first nut preferably the second nut being segmented and conical in shape tapering away from the first nut, the second nut having disposed thereupon a collet, the collet being further affixed to the bracket affixed to the seat track, (preferably the collet and bracket being formed from one member) the second nut being of a predetermined load bearing ability much greater than that of the first nut, whereby when the first nut is subjected to a load which is less than or equal to its load bearing capacity, the first nut will travel along the extension of the lead screw and thus moving the bracket to which it is interconnected, the bracket being interconnected with the moveable track as well thus effecting the movement of the seat track in the horizontal direction; the second nut and the collet being interconnected with the nut assembly and thus moving along with the nut assembly but not interfering with the nut assembly; however, when the first nut is subjected to a load which is greater than its load bearing capacity resulting in the failure of the first nut, such load will be transferred from the seat track to the bracket affixed to the collet, from the collet to the second nut, from the second nut to the lead screw, from the lead screw to the anchor means, from the anchor means to the mounting means, from the mounting means to the structure of the vehicle thereby resolving any loads disposed upon the seat track in a substantially horizontal direction by the nut assembly and the lead screw acting in communication.

According to yet another aspect of the invention, a seat adjuster may comprise at least one tubular element which is fastened to at least one bell crank of the seat adjuster by beading the at least one tubular member through at least one opening in the bell crank.

According to another aspect of the invention, a method of forming a nut used in conjunction with a lead screw for adjustment purposes may comprise the use of cold forming or swagging techniques to form the nut (preferably the nut being tubular).

According to another aspect of the invention, a method of forming a nut used in conjunction with a lead screw for adjustment purposes may comprise the use of electromagnetic forming techniques to form the nut (preferably the nut being tubular).

BRIEF DESCRIPTION OF THE DRAWINGS

FIG. 1 is a top view of the seat adjuster illustrating the components thereof in a preferred embodiment of the invention.

FIG. 2 is a front view of the seat adjuster of FIG. 1 illustrating the positioning of the components thereof in a preferred embodiment of the invention.

FIG. 3A is a close-up cross-sectional view of plastic insert 10 illustrated in FIG. 3 in a preferred embodiment of the invention.

FIG. 8A is a close-up top view of the structural nut 202 separated from the assembly illustrated in FIG. 8 in a preferred embodiment of the invention.

FIG. 8B is a cross-section view of the structural nut 202 of FIG. 8A taken across the segment 202F and line 'B—B' in a preferred embodiment of the invention.

FIG. 8C is a cross-sectional view of the structural nut 202 of FIG. 8A taken across line 'A—A' in a preferred embodiment of the invention.

DETAILED DESCRIPTION OF THE PREFERRED EMBODIMENTS

Figures 1A, 1B:
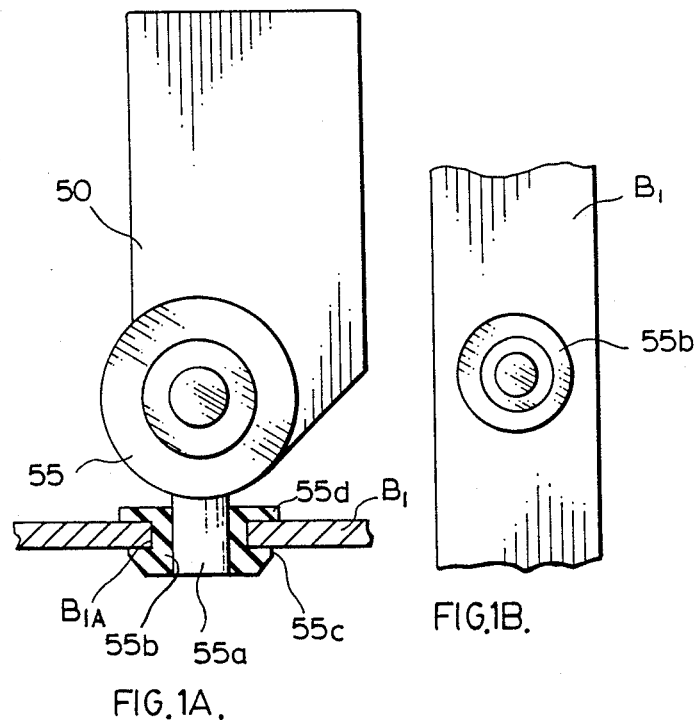
FIG. 1A is a view of a motor module illustrating the resilient mounting thereof in a preferred embodiment of the invention.

Referring now to FIG. 1 wherein the seat adjuster 10 is illustrated in top view depicting the inter-relationship of the components thereof. Seat anchor means 30, 31, as best illustrated in relation to FIG. 2, anchor the seat adjuster to the vehicle floor forwardly, and a compatible pair of anchors further anchors the seat adjuster to the floor of the vehicle rearwardly (not shown). A seat track assembly is affixed to these brackets 30, 31 via the lower fixed track 20 having abutting therein bearing surfaces 17 being of essentially C- and mirror image C-shape, attached to a double "J" shaped track, moveable within the fixed track. Fixed track 20 is essentially a U-shaped rail in cross-section, having disposed at the end of each of the U, radially extending flanges 20A, said flanges extending inwardly toward the center of the U and terminating proximate the double "J" shaped moveable track as best illustrated in relation to FIG. 2. The fixed track and the moveable track allow for the horizontal adjustment of the seat adjuster. Tubular element 70 and 80 extend from side to side of the seat adjuster and in part interconnect the rails at a tubular sleeve insert 70(a) beaded to the moveable rail 15 (which will be described in more detail within the specification), thereby assisting in the cooperative motion of the rails disposed at each side of the seat adjuster. Drive motors 40, 50 and 60 are fastened within the seat adjuster by brackets 50A and 60A and B₁ respectively being further mounted upon resilient grommets 50B, 55(b) and 60B, 65(b) respectively to absorb any shock loads which may be imparted to the drives 50 and 60 as best illustrated in FIG. 1A. Further all mountings for motors and gear boxes are mounted in a similar manner. The drives 50 and 60 are specifically for the purpose of vertical adjustment of the seat (not shown) interconnected with the seat adjuster. Drive motor 50 is located proximate the front of the seat adjuster for vertically raising or lowering the seat approximately 2″. Drive motor 60 is positioned proximate the rear of the seat adjuster for the adjustment of the rear of the seat at approximately 2″ adjustment. Such drive modules are best illustrated in relation to FIG. 1A and FIG. 6 wherein the components of the drive modules are fully described. Drive module 40 is disposed at the front of the seat adjuster having an integral gear box assembly 45 being resiliently mounted at lug 45A upon grommet 45(b) to absorb any shock loads communicated to the motor module from the seat adjuster, and having an integral lead screw 41 extending therefrom away from the gear box in a radial direction substantially horizontally toward the rear of the seat adjuster whereat an anchor nut 205 is disposed to anchor the integral lead screw at one end thereof and further the limit of travel of the components riding upon the lead screw 41. The anchor 205 also is a structural element which will be described in greater detail. Disposed at the other side of the seat adjuster is a gear box 47 driven by a shaft 46 extending from the end of the drive motor 40 remote the first gear box 45. Such a gear box 47 is typically known as a slave unit and is compatible with a gear box 45 in every respect with the exception of the direction of rotation of the input shaft 46. Thus 47 is essentially a mirror image of 45. An integral lead screw 48 extends radially outwardly from the gear box 47 in a direction substantially parallel with the lead screw 41 to establish a pair of lead screws which will horizontally adjust the seat adjuster. A nut assembly 200 is disposed upon the lead screw 48 and 41 respectively, such nut assembly being interconnected with the plate 100 and 105 respectively, the plate 105 and 100 respectively being connected to the moveable track 15 at one end thereof proximate the moveable track and being interconnected at the nut assembly 200 as best illustrated in relationship to FIG. 5 and FIG. 8. Thus the movement of the nut assembly 200 along the lead screws 41 and 48 will impart the motivation to move the seat track 15 within the fixed rail 20. As best illustrated in relation to FIG. 6, the horizontal drive 40 may comprise in an alternative embodiment a pair of horizontal drives. However, it is best for the structural considerations of the seat adjuster to assemble the mechanism as shown in relation to FIG. 1. The drive modules 50 and 60 have a shorter integral lead screw as illustrated in FIG. 6 but not illustrated in FIG. 1 because of the insertion of the lead screw within the tubular nuts 57 and 67 respectively, the tubular nuts being pivotally fastened at points 58 and 68 respectively to the bell crank mechanisms 85 and 90. The vertical motion is best illustrated in relationship to FIG. 4. The motion of the lead screws contained within the tubular nuts will cause the tubular nut to travel away from the drive motors 50 and 60 respectively and thus push the bell cranks 85 and 90 respectively, to cause the pivoting thereof and thus the adjustment of the seat in a vertical direction. The tubular members 70 and 80 provide a transmission element to ensure that the seat when raised vertically at the rear or at the front of the seat adjuster will not bind but will raise the seat uniformally.

Referring now to FIG. 1A, grommet 55(b) is illustrated passing through opening B1A wherein lug 55(a) passes through said opening. Such a grommet will resiliently cushion the lug to dampen vibrations being passed from bracket B to the lug 55(a). The grommet comprises a substantially annular ring having annular flanges 55(d) disposed on the side of the grommet proximate the gear reduction unit 55 and has annular hook portions 55(c) to lock the grommet within opening B1A.

Figure 3:
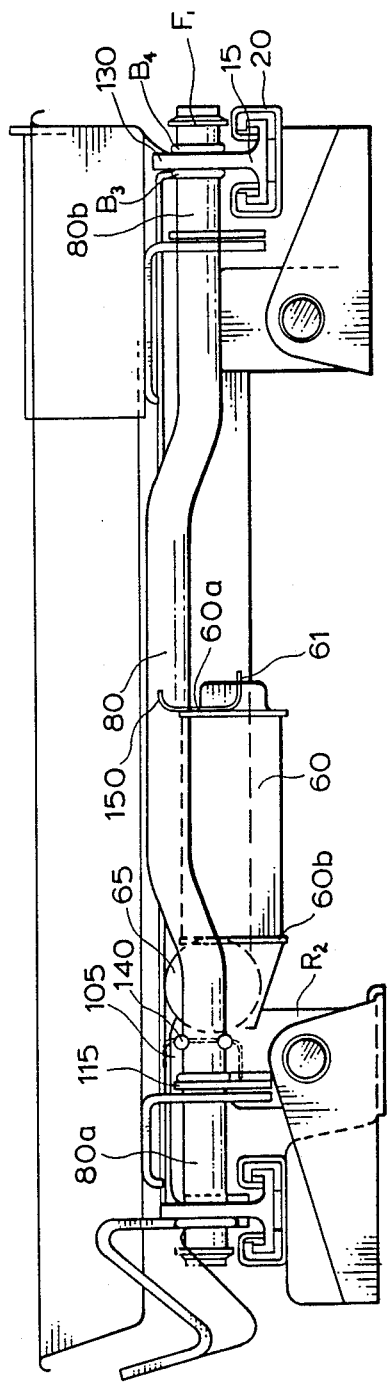
FIG. 3 is a rear view of the seat adjuster of FIG. 1 illustrating the inter-relationship of the components thereof in a preferred embodiment of the invention.

Referring now to FIGS. 2 and 3, the components thereof are illustrated wherein tubular member 70(a) and 70(b) and 80(a) and 80(b) are beaded to the track 15 at the ends thereof, thereby eliminating the need to weld the tubular members to the moveable track 15. The torque tubes 70 and 80 are then inserted within the openings of tube elements 70(a) and 70(b), and 80(a) and 80(b) respectively and fastened on the exterior thereof by fasteners $F_1$, $F_2$, $F_3$ and $F_4$ respectively. Further, the bell crank 90 and 85 are fastened to the torque tubes 70 and 80 in a novel way which will be described in greater detail.

Figure 4:
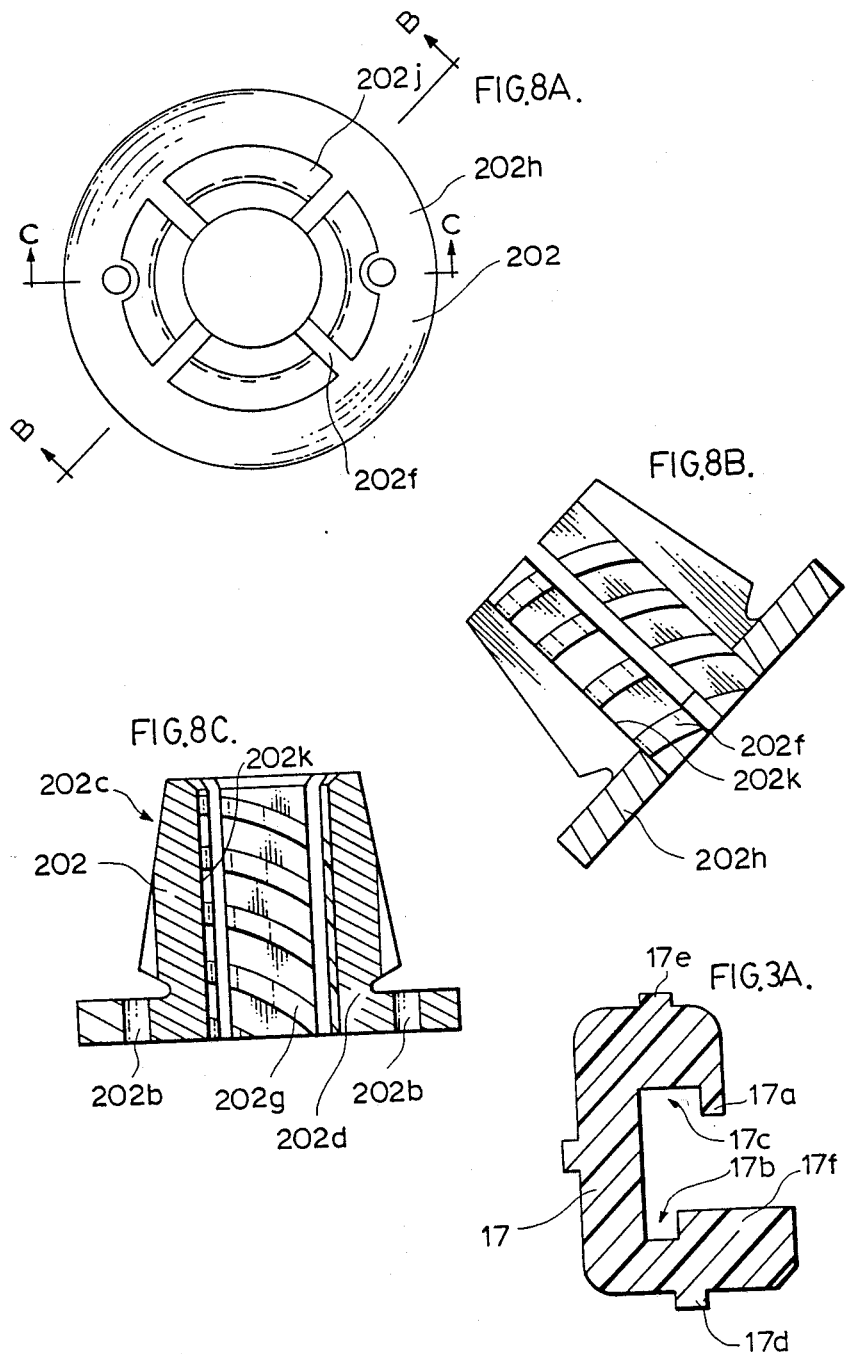
FIG. 4 is a side view of the seat adjuster of FIG. 1 illustrating the inter-relationship of the components thereof in a preferred embodiment of the invention.

Referring to FIG. 4, the pin 220 is assembled in a slotted opening extending through the seat support bracket of the vehicle seat thus allowing the movement of the pin within the slot yet substantially eliminating the amount of play available to the pin. Such a joint will be described further in the application.

The seat adjuster and the drive components thereof are mounted with resilient bumpers, stops, o-rings, grommets and mountings at all joints in order to establish a minimum of shock load upon the components of the seat adjuster. Such resilient mountings are further illustrated in relationship to the seat adjuster in FIGS. 1 and 2. It is of course intended that not all the components illustrated and described be present in the seat adjuster, as alternative embodiments may preclude some or many of the components of the adjuster. Further, many of the joints established within the seat adjuster, or the drive modules thereof may be used in many alternative devices and are not limited to a seat adjuster in use.

Referring now to FIG. 2, wherein the seat adjuster is illustrated from the front of the mechanism for the purposes of illustrating the cross-section of the track assembly and the positioning of the horizontal drive. Further, the horizontal drive is illustrated in relationship to its integrated gear box as well as its slave gear box. Thus in FIG. 2 is illustrated seat adjuster 10 having disposed proximate the bottom thereof anchor means 31 and 30, the anchor means 30 and 31 having affixed thereto at the top thereof the generally U-shaped fixed rail 20, the rail 20 being of generally U-shaped cross-section having disposed proximate the end of each leg of the U a radially inwardly extending flange 20A. Extending from the radially extending flange is a downwardly extending flange 21 terminating proximate the moveable rail 15 thereat. The moveable rail 15 is generally a double "J"-shaped rail, being extruded from heat treated aluminium for simplicity in manufacture. It is also understood that the double "J"-shaped rail may be formed from any convenient material of suitable strength. The double "J" rail is inserted within the opening established within the generally U-shaped fixed rail. The moveable rail has fastened or clipped thereto generally C- and mirror imaged C-shaped outserts 17 upon which the moveable rail 15 will glide, thus outserts 17 providing a bearing surface. Referring to FIG. 3A, a preferred embodiment of the outsert 17 is illustrated having flanges 17A and 17F which clip or capture the moveable rail flanges 16 therein within openings 17(c) and 17B. Thus the outset 17 is fastened to the moveable track prior to assembly. It is also possible in an alternative embodiment to actually injection mold the outsert to flange 16 of the moveable track by conventional methods by etching or scoring the track's exterior surface to create pockets into which the plastic material may flow. The moveable rail is joined to the tubular member 70(a) and 70(b) at beaded joint 121 having beads disposed proximate the upper portion of the rail 15 and the torque tube 70 is inserted therein or fastened at fasteners F3 and F4. By beading the rail, a weldless joint is prepared which will sufficiently secure the torque tubes 70 within the tubular member 70(a) or 70(b) secured by the pair of beaded elements B1 and B2 to the track or rail 15.

The drive motor 40 has disposed at one end thereof an integral gear box assembly 45 having disposed therewithin reduction gears of conventional format. It is possible to construct the opposite end of shaft 46 extending through to the gear box as a worm shaft extending into a set of worm gears through which the reduction is accomplished. The shaft 46 extends away from the motor 40 toward the slave reduction gear 47 having contained therein compatible portions to those found within integrated gear box 45. The integral lead screws 41 and 48 respectively extend from the gear boxes 45 and 47 respectively as best illustrated in relationship to FIG. 1. Further the drive motor 50 is resiliently mounted at bumpers B6 further providing resilient mounting, shock load absorption and noise reduction for the seat adjuster 10. Further a bell crank 110 is beaded upon the tubular member 70 with a novel method of joining the two components. Such novel method will be described in relationship to FIGS. 10 through 14.

Referring now to FIG. 3, the seat adjuster 10 is illustrated from the rear thereof illustrating the resilient member 140 used in relationship to the mounting of the gear box assembly within the seat adjuster 10. The drive motor 60 is illustrated having an integral gear box 65 resiliently mounted at the side thereof proximate the motor at grommet 60B, and at the side thereof proximate the gearbox by mounting 65A resiliently mounted within grommet 60B, again for absorbing shock loads imparted to the drive motor through the gear box and vice versa. It is consistently intended that all mountings of all mechanisms be resiliently biased by rubber stops and mountings conveniently situated to absorb the shock load applied by the motors when moving the seat both in a horizontal and in a vertical direction, and to reduce the noise level of operation for the seat adjuster. It is important that such resilient loading take place in that the seat adjuster comprises a structural seat adjuster which will resolve all forces applied thereto.

Referring now to FIG. 4 wherein the seat adjuster 10 is illustrated from the side of the seat proximate the slave gear housing 47. All components described in relation to FIG. 1 are further illustrated in FIG. 4. In addition, the details of the tubular nut 57 and 67 respectively and their relationship to the bell cranks 110 and 115 respectively are best illustrated in FIG. 4. Thus it can be seen that by driving the integral lead screw as best illustrated in relation to FIG. 6 contained within the tubular nuts 57 and 67, that the bell crank 110 or 115 will pivot about its tubular element 70 and 80 respectively, the joint therebetween being sufficient to provide the necessary torque to the compatible crank disposed upon the opposite end of the tubular element 70 and 80 respectively. A bumper cushion or resilient element 70A and 80A is disposed upon the extremities of the tubular nuts 57 and 67 to allow for cushioning of the movement of the bell crank and the tubular nut at elbow $X_1$ and $X_2$ thereof. Further resilient members 57a) and 67a) are disposed proximate the gear boxes 55 and 65 to allow for resilient cushioning of the movement of tubular nuts 57 and 67 about their respective integral lead screws (not shown). Such a resilient mounting allows for movement between the components therefor without long-term deterioration thereof. Thus it is the travel of the tubular nut 57 and 67 upon the integral lead screws 55A and 65A which provides the motivation for the bell crank to pivot about tubular elements 70 and 80 and thus cause the vertical seat adjustment of the seat adjuster 10. Of course, it is obvious from the drawings that the drive tubular nut 57 is for the vertical adjustment of the front portion of the seat, and the drive tubular nut 67 is for the driving of the vertical adjustment of the rear portion of the seat. The gear box 47 which is slave to the drive motor 40 is illustrated in side view in FIG. 4 having a guard cover G to prevent tampering with the drive unit and protect it during shipping.

Referring to FIG. 2, the guard G is illustrated extending from side to side mounted proximate 45b) and 47b) respectively. A resilient mounting $G_2$ is illustrated circumscribing drive motor 40 to resiliently hold the drive motor within the guard G. The motor casing of module 40 may further be connected to guard G to stiffen the drive module. Alternatively, bracing means (not shown) may connect the gear box housings 45 and 47 to the motor 40 thus accomplishing the identical stiffening function to resist thereby twisting loads.

Further illustrated within FIG. 4 at the front thereof is a slot 230 extending through the riser 206 having the horizontally extending slot 230 which provides for the movement of the rivet 220 affixed to the bell crank 110. Such a slot arrangement is conventionally used to allow for any resolution of horizontal motion within the rotation of a bell crank system. However, in FIG. 4 the slot is illustrated being stiffened by lining member 240 such that the degrees of freedom of the movement of the rivet 220 are minimized thus substantially minimizing the amount of free play within the seat adjuster. Such a free play joint is best illustrated in relation to FIG. 7.

Still referring to FIG. 4, and 8, 8A, 8B and 8C, the horizontal lead 48 is illustrated extending integrally from the slave gear box 47 toward the stopping nut 205 disposed at the end E of the lead screw 48. As previously mentioned disposed upon the lead screw 48 is a nut assembly 200, the nut assembly comprising a nut 201 having a predetermined load bearing capability made from plastic materials to allow for the smooth motion of the horizontal adjustment for the seat adjuster in day-to-day use. Affixed to the first nut is a second nut 202 which is substantially tapered and conical in shape being affixed by pins 202a) at the abutting faces of the first nut and the second nut, the second nut being segmented by 4 slats and having a much greater load bearing capability than the first nut 201, and yet the second nut 202 is free to travel with the first nut during normal operation of the seat adjusters' horizontal adjustment by virtue of the clearance between the thread thereof and the lead screw. Abutting about the perimeter of the second nut 202 which is generally conical in shape is a tapered collet 203 which is affixed to the bracket members 105 and 100 respectively, but this is not shown well within FIG. 4. The first nut 201 made of plastic materials is further affixed to the brackets 100 and 105 respectively as illustrated in FIG. 1 and further in FIG. 5. Thus movement of the lead 48 in a predetermined direction during normal use will cause the first nut 201 of the nut assembly 200 to move and thus carry the remaining assembly of the nut assembly 200. However, when a load is exerted upon the seat adjuster via the seat belt assembly onto the seat track, and especially upon the moveable seat track, such seat track will resolve the loads imposed upon it in a vertical direction because of the novel features described in relation to FIG. 2 wherein the radial flanges 21 and 20 will co-operate with the double "J" formation of the moveable track to provide a rigid structural track which will not allow the buckling or the twisting of the flanges but will stand strong and resist typical loads during such as an impact and resolve such loads disposed upon the track in a vertical direction. However, the loads resolved upon the track in a horizontal direction will not be resolved by the track but will be resolved by the lead screw 48 by the following sequence of events. As best illustrated in relation to FIGS. 1 and 8, the brackets 105 and 100 are affixed to the moveable track 15. The horizontal unresolved load will be exerted upon the brackets 105 and 100 which are further connected to the first plastic nut 201 and the tapered collet 203. When a load of greater than the load bearing capacity of the first nut 201 is applied, the nut will fail thus passing the load from the brackets 100 and 105 to the tapered collet which will further force the segmented second nut 202 to be pressed and bind in toward the screw 48 thus resolving the horizontal forces to the lead screw 48 and passing it on down through the bracket 210 to the structural components of the vehicle. The screw will not at this point be free to rotate in any direction thus eliminating the risk of bending the system. The generally tapered shape of the collet 203 and the second nut 202 are to provide a wedging engagement between the collet and the nut when the unresolved horizontal forces are applied upon the collet thus pushing the interior surfaces and exterior surfaces of the nut and collet into compressive engagement thus deflecting the segments 202J (illustrated best in FIG. 8A) to bind against the lead screw and thus allowing the forces to be uniformally transferred to the lead screw 48. Of course, it is not intended that such a system or nut assembly be limited to the seat adjuster only but would have many applications within the uses of a lead screw driving mechanism where it is desirable to have a structural nut assembly within the mechanism to resolve any loads applied to the mechanism.

Figure 5:
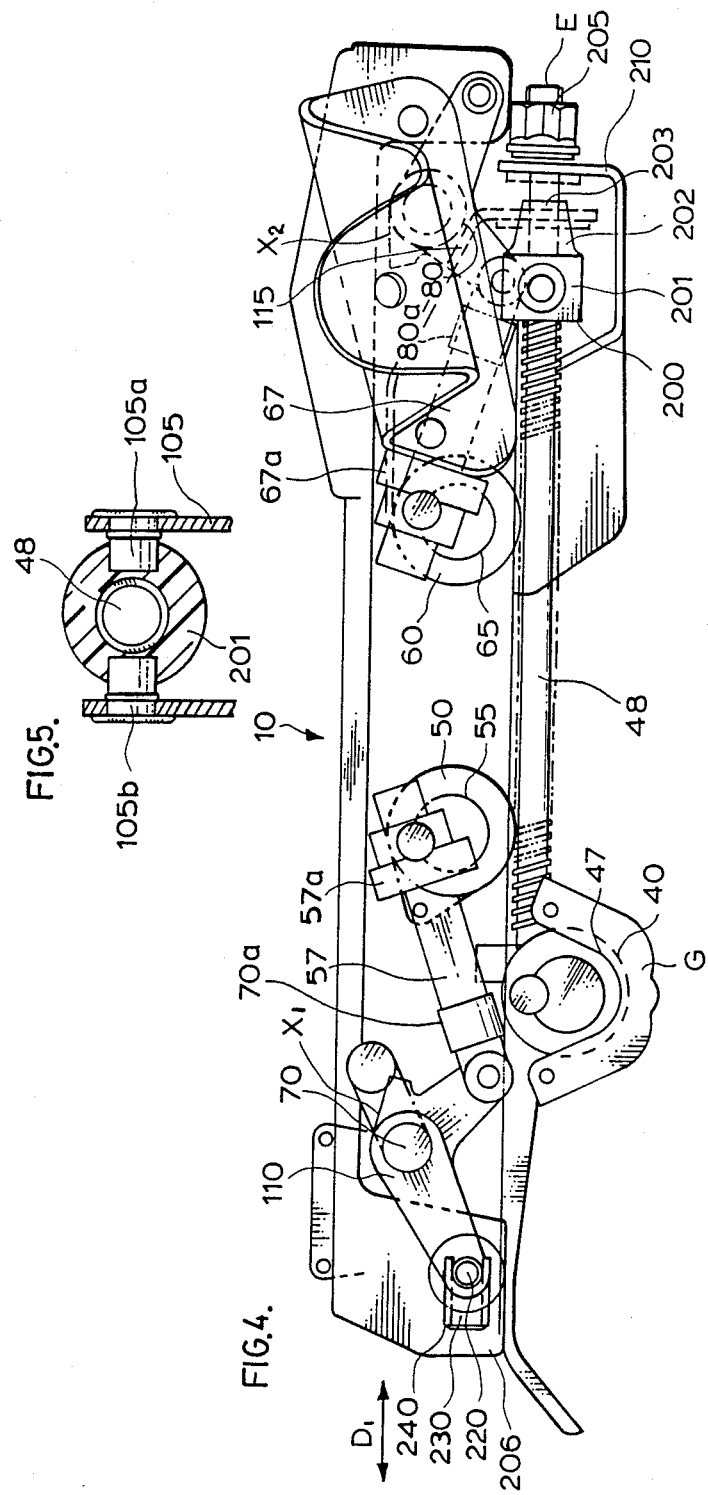
FIG. 5 is a close-up cross-sectional view of the nut assembly 200 in a preferred embodiment of the invention.
Figure 6:
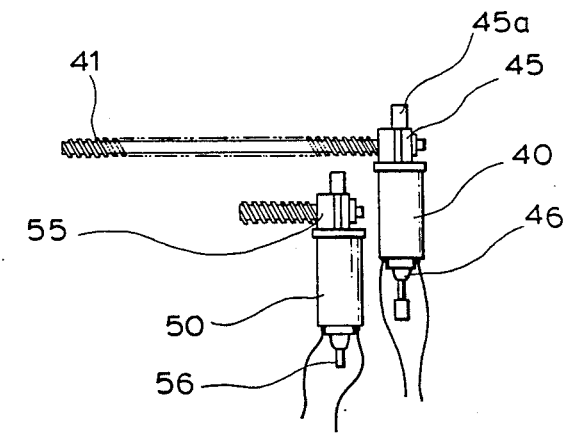
FIG. 6 is a perspective view of the motor modules utilized within the seat adjuster of FIG. 1 in a preferred embodiment of the invention.

FIG. 5 best illustrates the fastening between the first nut of the nut assembly 201 connected by pins 105A and 105B respectively to each end of the nut 201 and through to the bracket 105 as embodied in FIG. 5. Such an arrangement will allow for the smooth transmission of power during normal operation from the nut assembly and specifically from the first nut 201 which is a plastic nut for noise and backlash reduction purposes, to the bracket 105 which will smoothly drive the track 115 within the fixed rail 20. The insertion of plastic portions 17 further enhance the noiseless features found within the seat adjuster. Of course, it is not intended that the first nut nor the entire nut assembly be configured in the manner illustrated. It is intended, however, that the nut assembly provide both normal driving operation and abnormal force resolution capabilities within the seat adjusting mechanism. Such an inter-relationship of parts as illustrated in relation to FIG. 5 and FIG. 4 is further illustrated in relation to FIG. 8, 8A, 8B and 8C wherein all the components of the nut assembly 200 are illustrated in greater detail and wherein the forces applied from the collet through to the tapered segmented nut 202 through to the threaded screw 48 will be passed on through the screw to the anchor 205 and thus to bracket 210 to the structure of the vehicle. Further in relation to FIG. 5, the pin arrangements which lock the first nut 201 and the second nut 202 at 202A are illustrated. The stop 205 will continue to rotate freely at the end of the lead screw without interfering with the operation of the mechanism until such time as the seat belt load is resolved upon the system. In an alternative embodiment of the invention, the anchor 205 may include engaging means such as teeth upon the surface thereof proximate mounting 210 to bind into the mounting 210 and thus prevent the backdrawing of the lead screw when all of the drive components are deteriorated. Such an embodiment may be installed alone for this purpose or installed in conjunction with the structural assembly as a fail safe option.

Referring now to FIG. 6 wherein the motor modules illustrated within FIGS. 1 through 4 in use, are illustrated as separate entities in perspective for description purposes. The motor modules are constructed in a standardized fashion to provide uniform input, output and speed characteristics such that the motor modules may be interchangeable with one another whether they be disposed as a vertical adjusting drive or whether they be disposed as a horizontally adjusting drive. Such standardization of drives allows for ease of maintenance within the seat adjuster. However, it is not intended that the motor modules be limited to the use of a seat adjuster only. It is intended that the instant invention be further considered as a motor module for use in driving any mechanism wherein the motor module comprises a drive motor 40 and 50 contained within a housing 40 and 50 respectively. Integrally connected with the motor housing of each drive is a gear box 45 and 55 integrally connected with the motor 40 and 50 respectively. Extending from the gear box radially away from the drive module are integral lead screws 41 and 55A respectively. The lead screws may be of alternative pitch in order to accomplish the task at hand. For example, within the lead screws found within FIG. 1, the number of RPM's of the shaft although being standardized will cause considerably more movement in relation to the horizontal adjuster than in relation to a vertical adjuster in that the loads required to be moved will be essentially equivalent when moving the vertical adjuster approximately $1\frac{1}{4}''$ in full range vs. the movement of the horizontal adjuster 10" in full range. Such movement is accomplished by alternative thread-lead arrangement on the lead screws 41 and 55A respectively. Extending from the end of the drive module remote the gear box is a shaft 46 and 56 respectively. Illustrated in FIG. 6, a coupling 40 is illustrated in relation to drive 40 which allows for the installation of a slave gear box assembly therefrom. Further, the drive shaft 56 may drive a sensor whether analog or digital which would allow the establishment of a comfort adjustment by counting for example the number of revolutions of the motor or by establishing the voltage of for example a potentiometer which is proportional to a predetermined position of the seat. Such a comfort adjustment would be established within void V as illustrated in FIG. 1 in the preferred embodiment of the invention. It is also intended but not illustrated that the shaft extending into the gear boxes 45 and 55 directly from the armature of the drive motor would be a worm shaft and that the compatibly shaped gears within the gear housing 45 and 55 would be worm gears. Such a module would have many uses within the industry and other compatible industries, and it is not intended to limit the scale of such a drive module as well in that it would apply equally well to larger installations. Further, it is not intended that we limit the extension of the integral lead screw in the direction of that illustrated in relation to FIG. 6. The drive modules will have many uses outside of those proposed within the seat adjuster, and it is understood that such a proposition is only for the intention of illustration and example and is not intended to limit the use of the drive modules in any sense, again having the integral lead screw extending from whatever direction best established by the user. It is further intended that a remote sensor may be applied and assembled to the remote shafts 56 and 46 respectively as an alternative sensing device.

Figure 7:
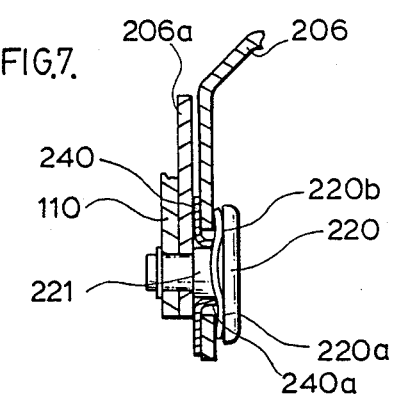
FIG. 7 is a close-up cross-sectional view of the pin 220 of FIG. 4 illustrating the anti-chuck features, the components thereof when assembled in a preferred embodiment of the invention.

Referring now to FIG. 7, a cross-sectional view of pin 220 illustrated in FIG. 4 and the free play features which are minimized by the instant invention. Thus referring to both FIG. 4 and FIG. 7, there is provided a rivet 220 having a head at one end thereof as in conventional methods but having a substantially cylindrical body extending through the opening 230 of the slot within riser 206. The rivet, of course, passes through the riser shown in cross-section in FIG. 7 and through the bell crank 110 at the extremity of the rivet wherein a plate 206A abuts the exterior of the bracket 206 having an arcuate member 240 extending from and fastened to the side of the riser plate 206 proximate the plate 206A, said arcuate portion 240 being welded in position to eliminate the amount of free play thereof, and the arcuate flanges extending from the arcuate portion at 240A having a predetermined radius of curvature to provide a springing action against the surfaces 220B and 220A of the rivet 220, the curvature defined by said flanges having the springing action such that there exists minimum free play to enter the system when the system is in use as rivet 220 slides along slot 230. Thus, the combination of the walls 220B and 220A respectively along with the flanges 240A along with the fastening of the lining member 240, provides minimum free play in the system while lining the slot 230 with element 240 which provides long reliable life to the anti-chuck feature of the seat adjusting mechanism. It is understood that the insert 240 may be manufactured from any materials which offer superior wear and sliding properties to the movement of the rivet 220 within the slot 230. For example, heat treated or surface hardened materials may be used. As best illustrated in relation to FIG. 4, the anti-chuck feature is provided at the front of the seat adjusting mechanism at both sides thereof, but could equally be incorporated at the back or front of the seat adjuster as a mechanism which is able to substantially minimize the amount of free play and hence the number of degrees of freedom available to the movement of the rivet 220 within the slot 230 with the continued cycling of the seat adjuster during its normal life span. It is important when manufacturing the insert mechanism 240 to ensure that there are no right angles, but that a smooth radius of curvature is obtained to provide the necessary springing action of the member 240 against the faces 220A and 220B of the rivet 220 respectively.

Figure 8:
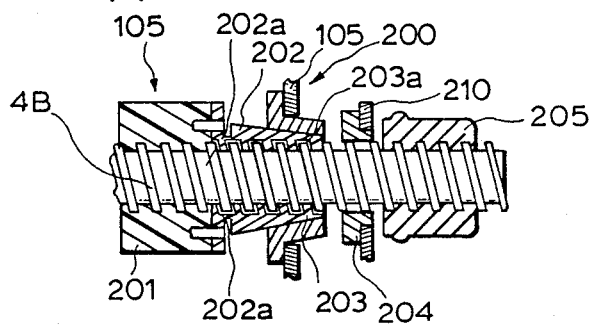
FIG. 8 is a close-up cross-sectional view of the nut assembly 200 illustrating the components thereof and the interrelationships thereof in a preferred embodiment of the invention.

Referring now to FIG. 8 wherein the lead screw 48 is shown in combination with the nut assembly 200 in use but isolated to illustrate the use of such a nut assembly with a lead screw in other applications than that illustrated in relation to FIG. 4. The nut assembly comprises a first nut 201 having a predetermined load bearing capacity and being affixed at pins 105A and 105B as illustrated in relation to FIG. 5, to the track bracket 105. In an alternative embodiment of the invention, the track bracket 105 may be integrally formed with the collet 203. Connected to the first drive nut is a second segmented drive nut 202, connected to the first drive nut 201 by pins 202A. As illustrated in FIGS. 8A, 8B and 8C, the nut 202 is of a generally tapered conical cross-section having compatibly shaped threading (not shown) therein for engagement upon lead screw 48 as does the first drive nut 201. Circumscribing the second tapered nut 202 is a collet or sleeve 203 which is further connected to the seat track bracket 105. Thus 105 is connected to the nut assembly at a multitude of locations thereby allowing the smooth movement of nut assembly 200 along the lead screw 48. A resilient bumper or anti-friction device 204 is provided upon the interior surface proximate the nut assembly proximate mounting member 210. The presence of such a resilient member provides for a noise reduction feature within the structure. A stop mechanism 205 is provided at the end of the shaft 48 which rotates freely as the lead screw rotates but does not impart any transmission of motion to any components. The purpose of 205 is to provide an anchor to limit the movement of the lead screw during for example impact situations. Under normal loading conditions, the nut assembly is driven by the motion of first nut 201 which will travel upon the lead screw in the direction driven as in conventional structures of a nut and lead screw assembly. However, the second nut and collet will follow the first nut during normal operation, thus providing an integral package for smooth transmission of the load through the lead screw through to the seat track bracket 105, or any loads applied to the nut assembly from the seat track bracket 105. Should the load applied upon the seat track bracket exceed the load bearing capacity of the first nut, such nut will fail wherein the second nut 202 will then provide any resolution of the forces applied from the seat track bracket 105 on such nut assembly 200. The collet 203 of the nut assembly will thereby receive the load from the seat track bracket, which will in turn pass the load from the collet to the second nut 202 which will be further forced to enter the inclined taper 203A of the collet thus deforming portions 202 J (in FIG. 8A) toward the lead screw thus binding the nut against the lead screw and insuring the proper grip between the second drive nut 202 and the lead screw 48. The second drive nut 202 will then pass any loads which are beyond the load carrying capability of the first drive nut to the lead screw which will then pass it along to the anchor member 205, from the anchor member 205 to the mounting member 210, to the structure upon which said nut assembly is being supported. The clamping down of the collet 203 upon the second drive nut 202 when a force greater than the load bearing capability of the first nut 201 is applied to the collet through the seat track 105, said collet will force the engagement of the threads of the lead screw 48 within the conical nut 202 and thus minimizing the risk of back driving of the nut assembly 202 when such an occurrence would be undesirable, for example during impact. Normally, the loading in a vehicle seat adjuster is applied to the seat track bracket 105 from the seat track which has the seat belt assembly affixed thereto. The vertical loads will be resolved by the novel track assembly provided by the instant invention as best illustrated in relation to FIG. 2. However, the horizontal forces will be unresolved unless such a nut assembly is provided, such nut assembly thereby using the lead screw and the predetermined pitch of the threading thereon to eliminate the risk of back driving of the nut assembly during such as an impact of an automobile, while providing a smooth operating noiseless feature within an automobile seat adjuster in normal periods of operation. Referring to FIGS. 8A, 8B and 8C, the structural nut 202 is illustrated being segmented and thus divided into four portions 202J being interconnected circumferentially at portion 202D proximate radial flange 202H allowing for the action of the collet against the nut 202. The optional design of threading is disposed upon surface 202K for the compatible meshing with that disposed upon the lead screw. The structural nut as shown comprises a flange 202H at one end and tapers as best illustrated in relation to FIG. 8B and 8C. Alternative embodiments of course would work equally well providing they incorporate the essence of the instant invention. Thus by providing such a nut assembly, the lead screw becomes a structural member within the seat adjuster assembly, or any other assembly in which the nut assembly as illustrated in FIG. 8 may be used. For example, such a nut assembly may find uses within the area of power tools, seat recliners, or any other devices wherein the advantages of the instant invention may be best utilized. It is not intended that the use of the instant invention be limited in any way and be restricted to only the applications within seat assemblies.

Figure 9:
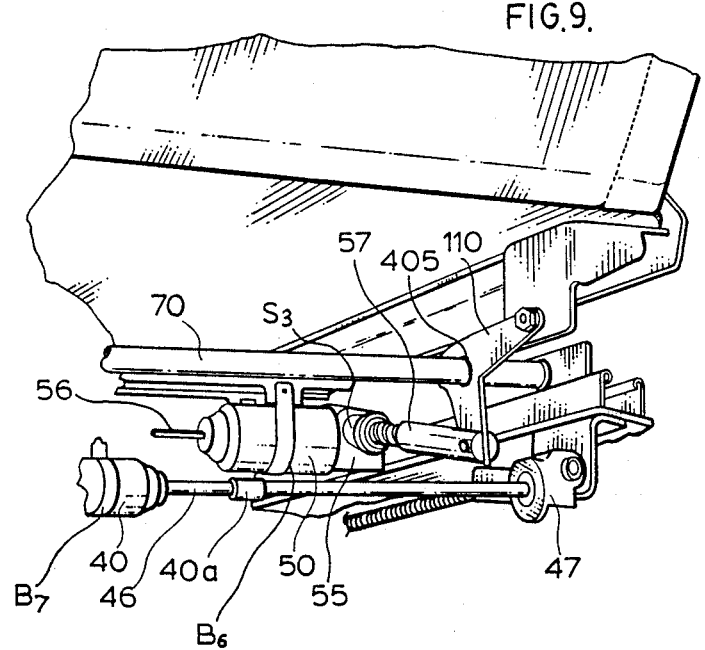
FIG. 9 is a perspective view of the seat adjuster from the front thereof illustrating the inter-relationship of the components of the instant invention in a preferred embodiment of the invention.

Referring now to FIG. 9 wherein the front of the seat adjuster is illustrated in perspective for explanation purposes of the integration of the features of the seat adjuster in the preferred embodiment of the invention. It is again not intended that such features would not be advantageously installed upon alternative structures and the following is offered as example only and is in no way intended to be limiting. Bell crank 110 is illustrated being affixed to the tubular nut 57 of the drive motor 50, such tubular nut having affixed near the top thereof resilient member B5 to minimize the impact of the shock loads upon the system. Further, the tubular nut 57 has a stop S3 located adjacent the integral lead screw extending from gear box 55 to prohibit the further advancement of the tubular nut upon the lead screw and establish predetermined positioning of such movement of the tubular nut. A resilient member within bracket B6 is provided to resiliently mount the motor 50 upon the under side of the seat. The tubular element 70 is connected to the bell crank 110 at joint 405 which is a unique joint beaded to fasten the tubular element thus eliminating any need for welding and also providing novel features within the beading to eliminate the concerns for torque transmission between the bell crank and the tubular element 70. Such novel beading will be described in relation to FIGS. 10 through 14. The drive module 40 is further illustrated being resiliently mounted on the motor support bracket by resilient member B7. Illustrating the "power take off" aspects of the unit at shaft 46 extending towards coupling 40A, which further connects to slave gear box 47 which will drive one side of the horizontal adjustment of the seat adjuster, not intending that the use of such drive module and slave and "power take off" features be limited only to seat adjusters. It is of course possible when using the motor module 50 having power take off 56, to drive a sensing device which may be used in predetermining the comfort positions of the seat adjuster or for that matter the number of rotations or the voltage when coupled with a digital or an analog device. It is not intended again that such a motor module be limited to the use of the seat adjuster only.

Figure 10:
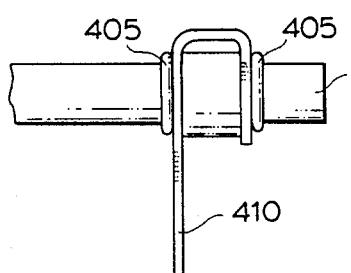
FIG. 10 is a front view of the beaded tube joint used in fastening the bell crank to a tubular element in a preferred embodiment of the invention.
Figure 11:
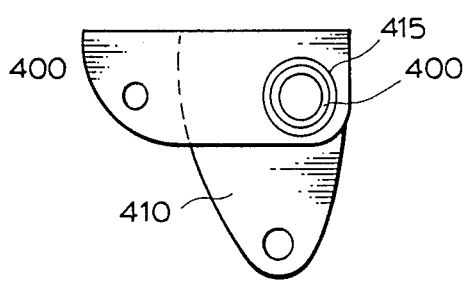
FIG. 11 is a side view of the tubular element and bell crank illustrated in FIG. 10.

Referring now to FIGS. 10 through 14, a unique method of beading a tubular element to a second member is provided. Thus a tubular element 400 is joined to a member 410, said member having a hole therethrough as illustrated in FIG. 11 wherein a jig (not shown) is used when forming the beaded joint to compress the walls of the tubular element 400, a die having recesses established therein such that when pressure sufficient to cause the material in the outer wall of the tubular element to flow is applied to the tubular element held within the die, then the beads 405 will form thus anchoring the member 410 in the opening 415. Such a joint will provide a connection between the member 410 and the tubular element 400, however, the tubular element 400 will be free to rotate in relationship to the joint and member 410.

Figure 12:
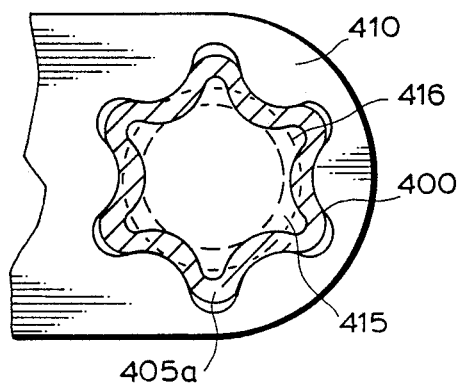
FIG. 12 is a close-up side view of the opening 415 extending through the bell crank in a preferred embodiment of the invention.
Figure 12A:
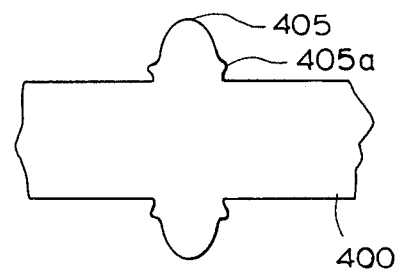
FIG. 12A is a schematic side view illustrating the beading and bead portions thereof in a preferred embodiment of the invention.

However, if recesses are established about the perimeter of the opening 415 through the member 410, the recesses being established proximate the exterior surface of both sides of the hole 415, such recesses will provide openings into which the metal of the tubular element 400 will flow during the formation of a beaded joint as illustrated in FIG. 10. The formation of such recesses will cause the formation of fastening portions about the perimeter of the bead 405 as illustrated in FIG. 12A. Such fastening portions 45A being of the predetermined pattern established by the recesses 416 formed about the perimeter of the opening 415 through bracket 410. The anchoring of the portions 405A within recesses 416 will provide a beaded joint which will prevent the rotation of tubular element 400 when installed upon bracket 410. This is particularly useful in providing a weldless joint which has torque bearing properties as a result of the interrelationship of the portions 405 within recesses 416. It is most desirable to form the recesses 416 about the perimeter of the opening 415 proximate the surface area of the bracket 410, however, it is not intended that such a method and procedure be limited to the formation of these portions at any location within the perimeter of the opening 415. The instant invention relates to a method of constructing a weldless joint which has torque bearing capabilities and the joint resulting from the method.

Figure 13:
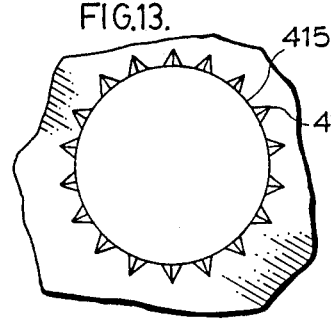
FIG. 13 is an alternative embodiment of the invention to that illustrated in FIG. 12.
Figure 14:
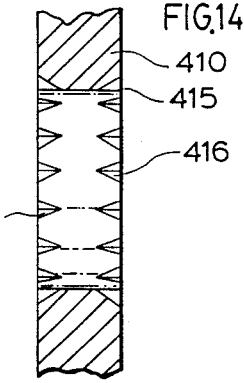
FIG. 14 is a cross-sectional view across the opening of FIG. 13 illustrating the embodiment of the opening in an alternative embodiment of the invention.

FIGS. 13 and 14 further illustrate an alternative embodiment of the layout of the recesses within the opening 415 being essentially triangular in shape and extending in pairs about the perimeter of the opening 415 as best illustrated in relationship to FIG. 14 wherein a cross-section of the opening 415 is illustrated through bracket 410. Tests conducted to date to compare such a joint with the conventional welding techniques have good results, however, the required fatigue and strength specifications of the specific application must be considered and tested in order to determine the shape and size of the openings 416 and their inter-relationship, that is to say whether they be disposed in pairs about the perimeter or offset in pairs about the perimeter, whether they have a generally triangular, diamond, oval, alternative shape which best provides for the strength characteristics required by each individual application. The two alternative structures illustrated for the openings 416 were tested to provide the most satisfactory results when judging the relative performance and evaluation of joints established by the instant beading method and joint thereof. The instant invention finds application within the bell crank and tubular element as illustrated in relation to FIGS. 2 and 3, however, it is not intended that such a technique be limited to the use of bell cranks and seat adjusters, wherein equal application may be found in assembling brake and clutch pedals or any other joint wherein a link is connected to a tubular element, wherein a torque tube arrangement is desirable.

As many changes can be made to the preferred embodiments without departing from the scope of the invention, it is intended that all matter contained herein be interpreted as illustrative of the invention and not in a limiting sense.

The embodiments of the invention in which an exclusive property or privilege is claimed are as follows:

1. A method of fastening, at least one tubular element at, at least one portion thereof to an at least one member of predetermined thickness, the method comprising establishing at least one opening through the at least one member, the at least one opening extending through the thickness of the at least one member, providing recesses within the at least one member, the recesses of predetermined configuration and being disposed about the perimeter of the at least one opening through the at least one member, the recesses extending radially away from the at least one opening and across at least a portion of the thickness of the at least one member, inserting the at least one tubular element within the at least one opening; holding the at least one tubular element and the at least one member within a jig; establishing recesses within the jig proximate each abutting edge of each of the tubular elements and the at least one opening through the at least one member; applying a predetermined force upon the ends of the at least one tubular element, the force being of a substantial predetermined magnitude to cause the wall portion of the at least one tubular element proximate the at least one opening and proximate the recesses established within the jig, to bead radially away from the at least one tubular element and further cause radial portions of each bead proximate the at least one opening to flow into the recesses formed within the at least one opening about the perimeter of the at least one opening; such beading providing fastening engagement between the at least one tubular element and the at least one member wherein no further fastening is required.

2. The method of claim 1 wherein the at least one member is planar.

3. The method of claim 1 or 2 wherein the recesses are formed in pairs adjacent the exterior edges of the at least one opening.

4. The method of fastening of claim 1 further comprising elements of a vehicle seat assembly wherein the at least one member of predetermined thickness is at least one crank, and the at least one tubular element is at least one torque tube.

5. The method of fastening of claim 1 further comprising elements of a vehicle seat assembly wherein the at least one member of predetermined thickness is at least one bell crank and the at least one tubular element is at least one torque tube.

6. At least one joint for fastening at least one tubular element to at least one member of predetermined thickness, the at least one joint comprising at least one opening through the at least one member, the at least one opening extending through the thickness of the at least one member, having recesses established within the at least one member, the recesses of predetermined configuration and disposed about the perimeter of the at least one opening through the at least one member, the recesses extending radially away from the at least one opening and across at least a portion of the thickness of the at least one member, the at least one tubular member for insertion within the at least one opening, the at least one tubular element and the at least one member being joined within a jig, having established recesses within the jig proximate each abutting edge of the at least one tubular element and the at least one opening through the at least one member, whereby when a predetermined force is applied upon the ends of the at least one tubular element, the force being of substantial predetermined magnitude to cause the wall portions of the at least one tubular element proximate the at least one opening and proximate the recesses established within the jig to bead radially away from the at least one tubular element and further cause radial portions of each bead proximate the at least one opening to flow into the recesses formed within the at least one opening about the perimeter of the at least one opening, such beading providing fastening engagement between the at least one tubular element and the at least one member wherein no further fastening is required.

7. The joint of claim 6 wherein the at least one member is planar.

8. The joint of claim 6 or 7 wherein the recesses are formed in pairs adjacent the exterior edges of the at least one opening.

9. The at least one joint of claim 6 further comprising elements of a vehicle seat, assembly wherein the at least one member of predetermined thickness is at least one crank, and the at least one tubular element is at least one torque tube.

10. The at least one joint of claim 6 further comprising elements of a vehicle seat assembly wherein the at least one member of predetermined thickness is at least one bell crank and the at least one tubular elements is at least one torque tube.

* * * * *